(12) United States Patent
Hoesli et al.

(10) Patent No.: US 12,500,531 B2
(45) Date of Patent: Dec. 16, 2025

(54) DRIVE UNIT WITH AT LEAST TWO OSCILLATING ARMS

(71) Applicant: MINISWYS SA, Biel (CH)

(72) Inventors: Raphaël Hoesli, Nidau (CH); Maxime Roten, Fenin (CH)

(73) Assignee: MINISWYS SA, Biel (CH)

( * ) Notice: Subject to any disclaimer, the term of this patent is extended or adjusted under 35 U.S.C. 154(b) by 605 days.

(21) Appl. No.: 17/918,636

(22) PCT Filed: Apr. 15, 2021

(86) PCT No.: PCT/EP2021/059801
§ 371 (c)(1),
(2) Date: Oct. 13, 2022

(87) PCT Pub. No.: WO2021/209559
PCT Pub. Date: Oct. 21, 2021

(65) Prior Publication Data
US 2023/0143336 A1    May 11, 2023

(30) Foreign Application Priority Data
Apr. 16, 2020 (EP) .................................... 20169935

(51) Int. Cl.
*H02N 2/06* (2006.01)
*H02N 2/04* (2006.01)
*H02N 2/14* (2006.01)

(52) U.S. Cl.
CPC .................. *H02N 2/06* (2013.01); *H02N 2/04* (2013.01); *H02N 2/14* (2013.01)

(58) Field of Classification Search
CPC .. H02N 2/06; H02N 2/04; H02N 2/14; H02N 2/026; H02N 2/103; H02N 2/001
See application file for complete search history.

(56) References Cited

U.S. PATENT DOCUMENTS

| 6,768,245 B2 | 7/2004 | Mock et al. |
| 7,429,812 B2 | 9/2008 | Witteveen et al. |
| 2007/0164635 A1 | 7/2007 | Witteveen et al. |
| 2015/0200612 A1 | 7/2015 | Matsukawa et al. |
| 2020/0252007 A1* | 8/2020 | Hoesli .................. H02N 2/0095 |

FOREIGN PATENT DOCUMENTS

| EP | 60-74982 A | 4/1985 |
| EP | 3 468 028 A1 | 10/2019 |
| WO | 01/41228 A1 | 6/2001 |

* cited by examiner

*Primary Examiner* — Emily P Pham
(74) *Attorney, Agent, or Firm* — Rankin, Hill & Clark LLP

(57) ABSTRACT

A piezoelectric drive unit is configured for driving a passive element relative to an active element, wherein the active element includes a resonator with two arms, each extending in parallel to a reference plane and ending in a contact element, which is movable by oscillating movements of the arms and thereby drives the passive element. Each of the arms has, at the outer end of the arm, a protrusion extending inward, toward the other arm, and on at least one of the arms, the respective contact element, arranged at the arm's outer end, extends outward, away from the other arm.

24 Claims, 2 Drawing Sheets

DRIVE UNIT WITH AT LEAST TWO OSCILLATING ARMS

BACKGROUND OF THE INVENTION

Field of the Invention

The invention relates to the field of oscillatory drives.

Description of Related Art

U.S. Pat. No. 6,768,245 B1, based on WO 0141228 A1, discloses a piezoelectric motor, with which a drive element, including a piezo element and contact elements, is elastically suspended, and by the piezo element is set into oscillations for driving a further body or passive element, by way of the contact elements.

U.S. Pat. No. 7,429,812 B1 discloses a piezoelectric drive unit with a resonator that includes at least two arms, arranged to extend from the same side of the resonator. Contact elements are located at the outer ends of the arms, and can be moved together or apart by way of oscillating movements of the arm pair, by which means a relative movement of a passive element with respect to an active element carrying the resonator can be effected. The passive element can be made to be elastic in itself. Alternatively, or in addition, the passive element can be elastically supported relative to the arm pair. These measures allow to transfer the oscillating movement and resulting forces exerted by the two arms in an efficient manner, and/or to compensate for imperfect alignment of the parts. In an embodiment, the contact elements at the outer ends of the arms face outwards, and the passive element includes two surfaces facing one another, between which the resonator is arranged to move.

SUMMARY OF THE INVENTION

There is a need to provide a linear drive that allows for a large range of relative motion between the passive and active element, while keeping the size of the drive small. More particularly, the need can be to arrange the drive in a very narrow space.

According to a first aspect, the drive unit is for driving a passive element relative to an active element, wherein the active element includes:
- a resonator and at least one excitation means for exciting oscillations in the resonator, the resonator including at least two arms extending from a connection region of the resonator at the same side of the connection region,
- the resonator and the arms extending in parallel to a reference plane,
- each of the arms including, at an outer end of the arm, a contact element,
- the contact elements being movable by way of oscillating movements of the arms,
- the passive element being arranged to be driven and moved relative to the active element by way of these oscillating movements;
- the passive element includes contact areas, each contact area being arranged to be in contact with a respective one of the contact elements;
- wherein each of the arms comprises, at the outer end of the arm, a protrusion extending in a first direction, the first direction being inward, toward the other arm or outward, away from the other arm, and on at least one of the arms, the respective contact element arranged at the arm's outer end extends in a second direction, the second direction being opposite to the first direction.

In other words, according to a first alternative, if the protrusions of the two arms extend inward, toward the other arm, then the contact element on at least one of the arms, arranged at the arm's outer end, extends outward, away from the other arm.

And according to a second alternative, if the protrusions of the two arms extend outward, away from the other arm, then the contact element on at least one of the arms, arranged at the arm's outer end, extends inward, toward the other arm.

In embodiments, on both of the arms, the respective contact element arranged at the arm's outer end, extends outward, away from the other arm.

Such a trajectory of the stiffness along the length of the arm can be achieved by shaping the arm from a flat piece of material, and by controlling the stiffness by adjusting the width of the arm measured in the reference plane. Thus, an end section of the arm including the protrusions and optionally the contact elements can be separated from the remainder of the arm by a necking.

In particular, the protrusions extend in a direction towards the resonator axis, and the contact elements extend in a direction away from the resonator axis, or vice versa.

In embodiments, for each of the arms, the stiffness of the arm with respect to rotation around an axis normal to the reference plane, has a minimum value at a location of the arm that is inward of an end section of the arm including the respective protrusion and optionally also the respective contact element.

This makes it easier for the end section with the protrusions to oscillate, by the arms flexing at the location with low stiffness.

In embodiments, the resonator is shaped from a flat piece of material, and an end section of the arm including the protrusions and optionally the contact elements is separated from the remainder of the arm by a necking.

A necking can be defined as a location along the length of the arm where the width of the arm, seen in the reference plane has a value that is locally minimal. That is, the width of the arm, when seen along the length of the arm, before and after the necking is larger than the locally minimal value.

A necking can, but must not, be defined in terms of an outer edge of the arm, that is, an edge most distant from the resonator axis, wherein points on the outer edge are more distant from the resonator axis in regions other than the necking, and a distance of the outer edge has a locally minimal value at the necking.

In embodiments, the first arm comprises, in a section opposite to the outer end, a first further contact element extending outward, away from the second arm, and the second arm includes, in a section opposite to the outer end, a second further contact element. extending outward, away from the first arm.

According to a second aspect, the drive unit is for driving a passive element relative to an active element, wherein the active element includes:
- a resonator and at least one excitation means for exciting oscillations in the resonator,
- the resonator including a first pair of arms extending from a connection region of the resonator at the same side of the connection region,
- the resonator and the arms extending in parallel to a reference plane, each of the arms including, at an outer end of the arm, a contact element, the contact elements being movable by way of oscillating movements of the arms, the passive element being arranged to be driven and moved relative to the active element by way of these oscillating movements;

the passive element includes contact areas, each contact area being arranged to be in contact with a respective one of the contact elements;

wherein the resonator includes a second pair of arms extending from the connection region of the resonator in the opposite direction as the first pair of arms.

In embodiments, each of the arms of the first pair of arms comprises, at the outer end of the arm, a protrusion extending inward, toward the other arm, and on at least one of the arms of the first pair of arms, the respective contact element arranged at the arm's outer end extends outward, away from the other arm.

In embodiments, each of the arms of the second pair of arms comprises, at the outer end of the arm, a protrusion extending inward, toward the other arm, and on at least one of the arms of the second pair of arms, the respective contact element arranged at the arm's outer end extends outward, away from the other arm.

In embodiments, each of the arms of the second pair of arms comprises, at the outer end of the arm, a protrusion extending inward, toward the other arm, and on at least one of the arms of the second pair of arms, the respective contact element arranged at the arm's outer end is part of the respective protrusion extending inward.

In embodiments, the shape of first and second pair of arms are substantially mirror-images of one another.

According to a third aspect, the drive unit is for driving a passive element relative to an active element, wherein the active element includes:

a resonator and at least one excitation means for exciting oscillations in the resonator, the resonator including at least two arms extending from a connection region of the resonator at the same side of the connection region, the resonator and the arms extending in parallel to a reference plane, each of the arms including, at an outer end of the arm, a contact element, the contact elements facing outward, away from the other arm, the contact elements being movable by way of oscillating movements of the arms, the passive element being arranged to be driven and moved relative to the active element by way of these oscillating movements;

the passive element includes contact areas, each contact area being arranged to be in contact with a respective one of the contact elements;

wherein the resonator is shaped from a flat piece of material, wherein between each of the arms and the connection region there is an attachment necking.

In embodiments, each of the arms, from the attachment necking includes an active section that extends in a first direction parallel to the resonator axis towards the respective outer end with the respective contact element, and a counterweight section, that extends in a second direction opposite to the first direction.

In embodiments, for each of the arms, the stiffness of the arm, with respect to rotation around an axis normal to the reference plane, in the counterweight section and in the active section where it is joined to the counterweight section is smaller than in the attachment necking.

In embodiments, the stiffness in the active section up to and not including a necking at which the arm is bent outward toward the respective contact element is smaller than in the attachment necking.

In embodiments, the excitation means covers at least the attachment necking and part of the counterweight section and part of the active section.

In embodiments, the excitation means covers cut-out regions in the resonator that create the attachment necking.

According to a fourth aspect, the drive unit is for driving a passive element relative to an active element, wherein the active element includes:

a resonator and at least one excitation means for exciting oscillations in the resonator, the resonator including at least two arms extending from a connection region of the resonator at the same side of the connection region, the resonator and the arms extending in parallel to a reference plane, each of the arms including, at an outer end of the arm, a contact element, the contact elements being movable by way of oscillating movements of the arms, the passive element being arranged to be driven and moved relative to the active element by way of these oscillating movements;

the passive element includes contact areas, each contact area being arranged to be in contact with a respective one of the contact elements;

wherein the resonator is shaped from a flat piece of material, and wherein in regions covered by the excitation means, the resonator includes holes or openings.

This decreases stiffness of the resonator and can reduce mechanical losses.

The features according to the fourth aspect can be combined with the features of each of the preceding aspects.

For all embodiments according to all aspects the following can be the case:

Each arm extending from the connection region can be said to be connected to the connection region at a proximal end of the arm, and its contact element is arranged at a distal end of the arm. The direction in which the arms extend corresponds to a resonator axis. The resonator with the excitation means and without the arms can be mirror-symmetric with regard to the resonator axis, e.g. when seen in a projection onto the reference plane. The resonator including the arms can be substantially mirror-symmetric with regard to the resonator axis.

With regard to the resonator axis, generally one or more of the following can be the case:

the connection region includes at least one fixation or support area, at which the resonator is attached to a base, and which is located on the resonator axis; and/or the resonator axis, seen in a direction normal to the reference plane, passes through the centre of the excitation means; and/or the resonator axis lies in regions of the resonator and/or the excitation means where oscillation amplitudes are the lowest.

The oscillating movements of the arms can cause the contact elements to move towards one another and away from another, which can be the result of each contact element moving along a generally ellipsoidal path. Movement of each path can be clockwise or counter clockwise (seen in the plane of the resonator), and the orientation of the main axes of the ellipsoid can vary. The movement direction and orientation can be controlled by adjusting an excitation frequency of the excitation means. The excitation means typically is a piezoelectric element. Further details of such drives are described in the initially cited U.S. Pat. Nos. 6,768,245B1 and 7,429,812B1. The ellipsoidal movement can correspond to a very flat ellipse, and thereby can also correspond to an almost linear or entirely linear back and forth movement. In such cases the orientation of this back-and-forth movement determines the way in which the passive element is driven. In particular, the orientation of the movement, in combination with an amplitude of the movement also affects a driving force.

A contact element (part of the active element) touches the contact body (part of the passive element) at contact areas. It can be the case that the drive is configured for a pre-stress force to be present between the contact elements of the active element and the contact areas of the passive element when the drive is not oscillating, that is, when the excitation means are not being excited. Contact forces related to a pre-stress, if present, will be generally normal to the contact surfaces where the parts touch, and in particular normal to a contact surface in the contact area, in particular normal to a tangent plane thereof. The entirety of such a contact or pre-stress force can be normal to the contact surfaces, or such a force can be at an angle to the normal, with only a vector component of the force being normal to the contact surface.

It is understood that being in contact can mean being in contact intermittently during operation of the drive unit, as the oscillating arms intermittently are in contact and move away from the respective areas on the contact body.

In embodiments, the resonator of the active element is manufactured in one piece. For example, it is manufactured from a single piece of sheet material, for example, from a sheet of metal.

In embodiments, the resonator includes a first surface and an opposed second surface, both parallel to the reference plane, and wherein one excitation means is arranged on the first surface and optionally wherein another excitation means is arranged on the second surface.

Typically, the passive element is arranged to translate along a linear movement axis, the linear movement axis being parallel to the reference plane, and in particular also parallel to the resonator axis.

In embodiments, the passive element is arranged to rotate around a rotary movement axis, the rotary movement axis being parallel to the reference plane, and in particular also perpendicular to the resonator axis.

In a method for operating the drive unit, the excitation means is supplied with an electrical voltage at different frequencies, thereby generating different movement patterns of the arms and the contact regions, according to the frequency. Different movement patterns cause the passive element to move linearly, according to a degree of freedom defined by a suspension of the passive element relative to the active element. The suspension can be based on a slide bearing or a roller bearing, for example.

Throughout the present text, where parts are manufactured from a single piece of sheet material, for example, from a sheet of metal, this can done by a subtractive process, such as cutting or stamping or etching as well as by an additive process, such as selective laser melting, electron beam melting or direct metal laser sintering.

In embodiments, a wear suppressing element is arranged on the passive element in the contact areas.

In embodiments, the wear suppressing part is made of a material with a higher degree of hardness than a surrounding region of the passive element or is created by a hardening treatment of the material of the passive element.

In embodiments, the wear suppressing part is made of a ceramic material.

In embodiments, the contact elements each include flat region.

In embodiments, a resonator length is defined as the dimension of the resonator along the resonator axis, from the ends of the arms to the opposing ends of their counterweight sections, and wherein the extension of each flat region, projected onto the reference plane, is between one tenth and one hundredth of the resonator length, in particular between one twentieth and one eightieth of the resonator length.

In embodiments, the length of the resonator is between three and five millimetres, in particular four millimetres, and the extension of the flat region is between 0.05 millimetres and 0.15 millimetres, in particular between 0.08 millimetres and 0.12 millimetres, in particular 0.1 millimetres.

In embodiments, the surface of the resonator and/or the passive element is treated with high precision vibratory finishing or chemical polishing.

BRIEF DESCRIPTION OF THE DRAWINGS

The subject matter of the invention will be explained in more detail in the following text with reference to exemplary embodiments which are illustrated in the attached drawings, which schematically show.

DETAILED DESCRIPTION OF THE INVENTION

In principle, identical parts are provided with the same reference symbols in the figures.

Figures 1, 2:
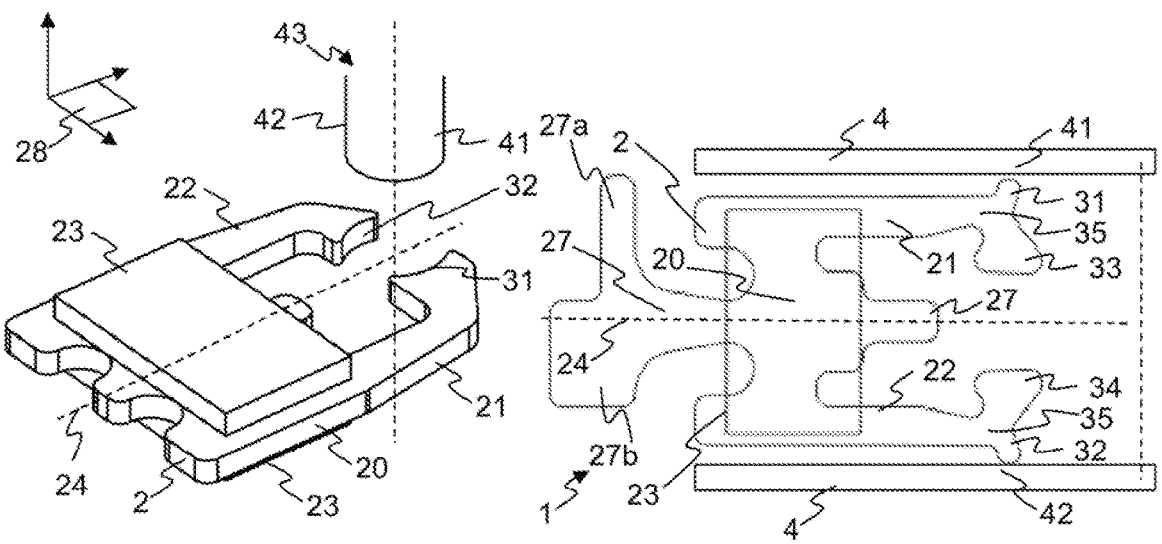
FIG. 1 elements of a drive unit according to the prior art.
FIGS. 2-5 linear drive units with protrusions extending inward and contact elements extending outward.

FIG. 1 schematically shows, in an exploded view, elements of a prior art drive unit, with an active element 1 and a passive element 4. The active element 1 includes a resonator 2 or resonator plate 2 and two excitation means 23. From a connection region 20 of the resonator 2, a first arm 21 and second arm 22 extend in the same direction, corresponding to a resonator axis 24. The resonator 2 and the arms 21, 22 extend in parallel to a reference plane 28. At the end of each arm there are respective first contact elements 31 and second contact elements 32, designed to contact and move the passive element 4 by means of contacting first contact areas 41 and second contact areas 42 of the passive element 4. These contact areas are not necessarily in a fixed relation to the moving passive element 4, rather they are the locations where the contact regions 31, 32 currently contact the passive element 4, as the passive element 4 rotates about a rotary movement axis 25 (in FIG. 1) or translates (in other embodiments) relative to the active element 1.

As explained in U.S. Pat. No. 7,429,812 B1 cited above, an excitation frequency of a voltage generator driving the excitation means 23, which can be a piezoelectric element, can be varied, and depending on the frequency different modes of mechanical oscillations of the arms will be generated. For example, in one mode the contact regions 31, 32 will—seen in a projection onto the reference plane—both rotate clockwise, in another both will rotate counter clockwise, and in another one will rotate clockwise and the other one counter clockwise. As another example, in one mode the contact regions 31, 32 will move back and forth at a first angle, and in another mode at a second angle. Depending on the suspension of the passive element, i.e. rotary or linear or combined rotary-linear, the passive element will move accordingly.

The following embodiments operate according to the same basic principles. If not stated otherwise, the elements described so far, if present, have essentially the same function. However, the arms 21, 22 are adapted for a movement of linear drive. The location of the excitation means 23 relative to the resonator 2 is represented in a schematic by a rectangle corresponding to the contour of the excitation means 23 attached to one or both sides of the resonator 2.

FIGS. 2-5 shows linear drive units with protrusions 33, 34 extending inwards and contact elements extending outwards. The first arm 21 includes a first protrusion 33 or projection in the direction of the second arm 22. The second arm 22, being essentially the mirror image of the first arm 21 with regard to the resonator axis 24, includes a second protrusion 34 in the direction of the first arm 21. Thus, both protrusions 33, 34 extend towards the resonator axis 24, that is, towards the inside of the drive.

The first arm 21 includes first contact elements 31 projecting away from the second arm 22, that is, in a direction opposite to that in which the first protrusion 33 extends. Likewise, the second arm 22 includes second contact element 32 projecting away from the first arm 21, in a direction to that in which the second protrusion 34 extends. Thus, both contact elements 31, 32 extend away from the resonator axis 24, that is, towards the outside of the drive. here they come into contact with the respective first contact area 41 and second contact area 42 of the passive element 4.

The passive element 4 element is schematically represented by two rectangles, corresponding to two linear guides movable in relation to the active element 1. The two guides at the two sides of the passive element 4 are mechanically connected, as represented schematically by a dashed line. The mechanical connection can be rigid, or resilient, in which case it can be part of an arrangement generating a pre-stress acting on the first contact element 31 and second contact element 32 via the first contact area 41 and second contact area 42.

The first protrusion 33 and second protrusion 34 are linked to the remainder of the respective first arm 21 and second arm 22 by a corresponding necking 35. This necking 35 corresponds to a flexurally weaker region along the respective arm. That is, the stiffness of the arm to bending around an axis normal to the reference plane 28 is lower at the necking 35 than in other places. When in operation, with the arms oscillating, each protrusion can exhibit an oscillating movement including a small rotation around the respective necking 35. This in turn can lead to a corresponding movement of the respective contact element that is arranged at the same end or the respective arm.

The resonator 2 can include at least one or more fixation or support area(s) 27 at which the resonator is attached to a base (not shown). The fixation area(s) 27 typically is or are located on the resonator axis 24. They typically do not oscillate to a significant degree, being attached to the base.

The fixation area(s) 27 can feature additional protrusion(s) such as 27a and 27b to facilitate the electrical connection of the resonator as well as its assembly on a base (not shown).

Figures 3A, 3B:
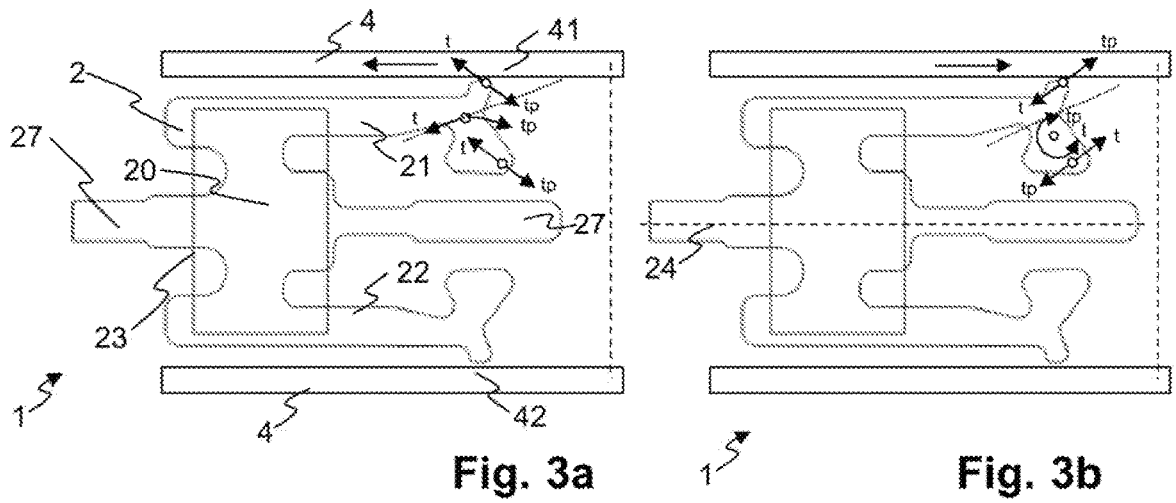

FIGS. 3a and 3b show on the one hand a further embodiment, in which the fixation area(s) 27 are shaped differently from that of FIG. 2, and also illustrate the movement mentioned above of the protrusions 33, 34 and contact elements 31, 32. Their movement, along with movement near the necking, is represented by double arrows. FIG. 3a shows a mode of oscillation and movement, at a first frequency of excitation, that pushes the passive element 4 to the left, represented by a single headed arrow. FIG. 3b shows a mode of oscillation and movement, at a second frequency, that pushes the passive element 4 to the right. At the end of each arrow it is indicated at which time a corresponding material point is displaced in the direction of said arrow. If a material point is in one location at time t, corresponding to an extreme position in the direction of the corresponding arrow, then the extreme position in the opposite direction is attained half a period later, indicated by time tp. The time difference between t and tp is ½f, where f is the first frequency (FIG. 3a) or the second frequency (FIG. 3b).

Figures 4, 5:
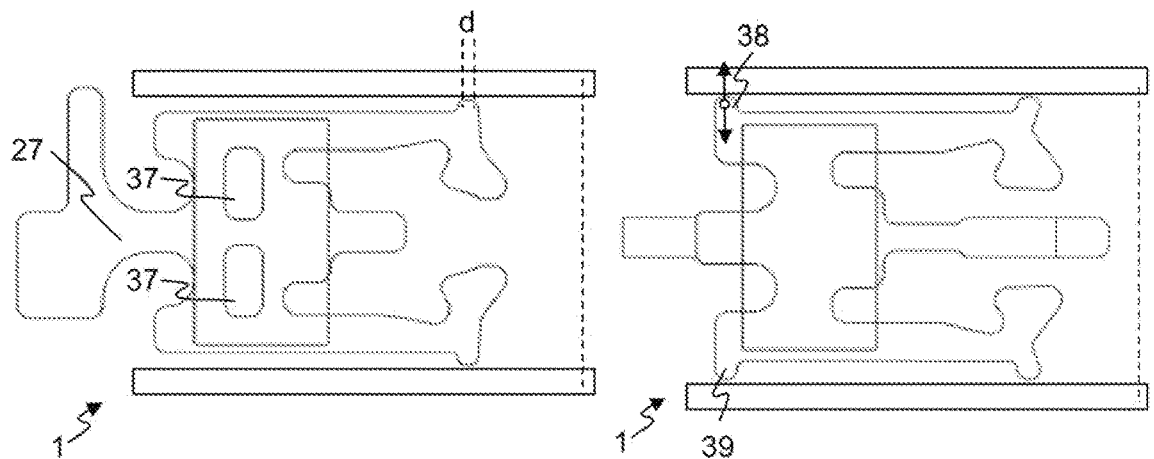

FIG. 4 shows a drive as in the preceding figures, with the difference that the resonator 2 includes openings or holes 37. These serve to reduce the mechanical stiffness of the resonator 2, which in turn can allow to drive the resonator 2 with lower electromechanical losses and/or with lower voltages.

This figure also illustrates an extension d of a flat section of a contact element 31 in the reference plane 28. The extension can be related to a resonator length, the resonator length being defined as the dimension of the resonator along the resonator axis 24, from the ends of the arms 21, 22 to the opposing ends of their counterweight sections (if present). In other words, the resonator length is the size of the resonator 2 in the direction along resonator axis 24, without fixation or support area(s) 27. The extension d of the flat region is measured on a projection of the flat region projected onto the reference plane 28.

FIG. 5 shows an embodiment wherein the first arm 21 includes, in a section opposite to the outer end, a first further contact element 38 extending outward, away from the second arm 22, and the second arm 22 includes, in a section opposite to the outer end, a second further contact element 39. extending outward, away from the first arm 21. The length of these sections can be chosen such that the further contact elements 38, 39, for both the first and the second frequency of excitation, move essentially at a right angle to the surface at which they contact the passive element 4. This direction is indicated by a double arrow. In this case the further contact elements 38, 39 do not contribute to the driving force. However, they can contribute to a holding or braking force when the drive is not being excited. This is especially the case if a pre-stress force is present between the two opposing faces of the passive element 4 acting on the resonator 2.

The length of these sections can also be chosen such that the further contact elements 38, 39, for the first, respectively the second frequency of excitation, moves with an angle to the surface similar with the angle of the contact elements 31, 32. In this case the further contact elements 38, 39 do contribute to the driving force.

The sections of the arms opposite to their outer end can be considered to be counterweight sections. In embodiments, they extend, from the excitation means 23 and in a direction parallel to the resonator axis 24, less than half or less than one third or less than one fourth or less than one fifth than the respective arm.

Figure 6:
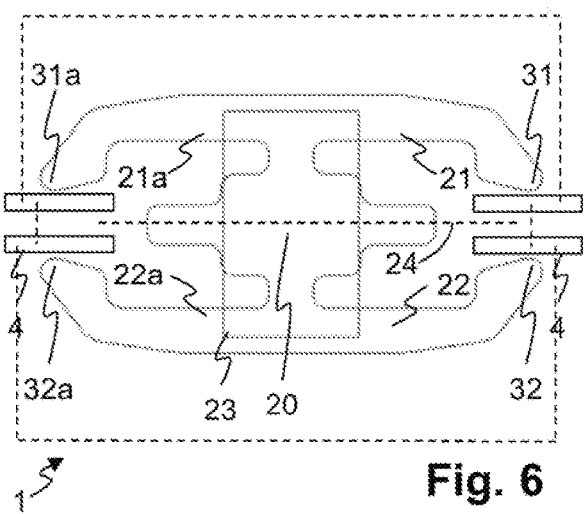
FIGS. 6-8 linear drive units with a first and second pair of arms extending in opposite directions from the same connection region.
Figure 7:
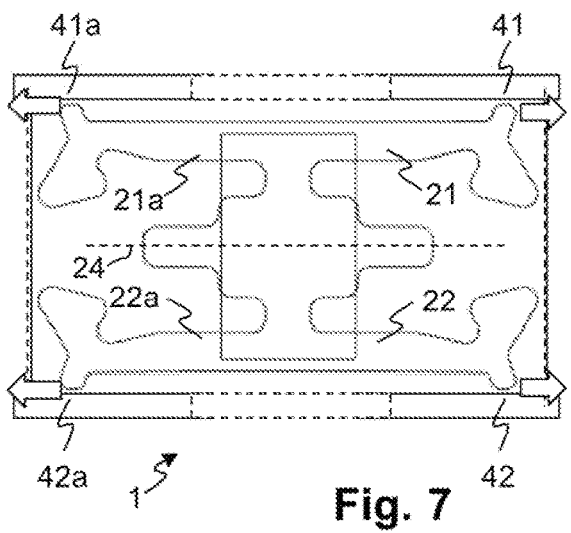
Figure 8:
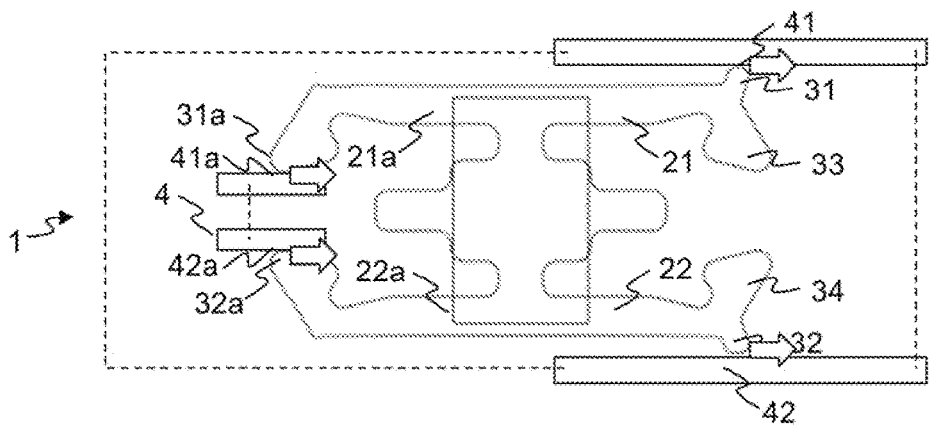

FIGS. 6-8 shows linear drive units with a first and second pair of arms extending in opposite directions from the same connection region. Each pair is arranged in mirror symmetry to the other, in relation to the connection region 20 and the excitation means 23. In these embodiments, the relative position and orientation between the active element 1 and passive element 4 in the reference plane 28 can be determined entirely via contact areas 41, 42, 41a, 42a of the passive element 4.

In the embodiment of FIG. 6, the contact elements 31, 32, 31a, 32a of both pairs of arms are oriented towards one another and the opposite arm of the same pair, with the passive element 4 being arranged between a respective pair of contact elements.

In the embodiment of FIG. 7, the contact elements 31, 32, 31a, 32a of both pairs of arms are oriented away from one another and the opposite arm of the same pair, with contact faces or contact areas 41, 42, 41a, 42a of the passive element 4 being arranged outside a respective pair of contact elements and facing inward.

In the embodiments of FIGS. 6 and 7, wherein the shape of first and second pair of arms are substantially mirror-images of one another, the movement of the two pairs of arms is also symmetric, and thus active element 1 exerts a force that pushes separate sections of the passive element 4 driven by the two pairs of arms apart or pulls them towards one another in the direction of the resonator axis 24. Thus, a connection between these separate sections can be resilient and/or include a linear joint, allowing the separate sections to move relative to one another in the direction of the resonator axis 24. Within each of these separate sections, a mechanical connection between opposing first and second contact areas 41, 42 for the first pair of arms and 41a, 42a for the second pair of arms) can be resilient, in particular for generating a pre-stress force between the respective pair of arms.

In the embodiment of FIG. 8, the contact elements 31, 32, of the first pair of arms 21, 22 are oriented away from one another and the opposite arm of the same pair, and the contact elements 31a, 32a of the second pair of arms 21a, 22a are oriented towards one another and the opposite arm of the same pair. Thus, the shapes of the first and second pair of arms are substantially mirror-images of one another, except for the contact elements in the first pair of arms extending outwards. The sections of the passive element 4 driven by the two pairs of arms are driven in the same direction by an essentially symmetric movement of the arms. This is indicated by block arrows showing the direction of the driving force for one of the driving frequencies. For the same mode of oscillation, in the embodiment of FIG. 8 they point in the same direction, in that of FIG. 7 in opposite directions.

Figure 9:
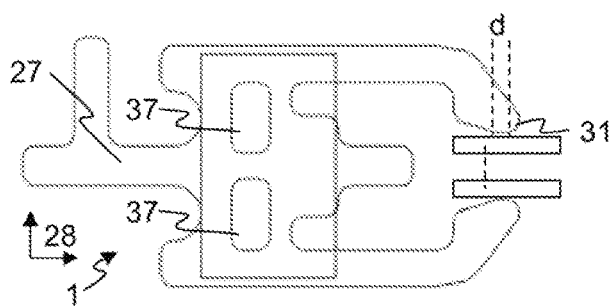
FIG. 9 a linear drive unit in which the resonator includes openings.

FIG. 9 shows a linear drive unit in which the resonator includes openings or openings 37, as already presented in the context of FIG. 4. In this embodiment, both the contact elements 31, 32 and the protrusions 33, 34 face inward.

Figure 10:
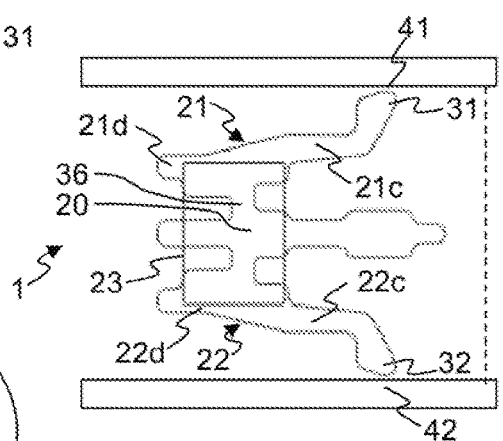
FIG. 10 a linear drive unit in which the resonator arms are elastically suspended.

FIG. 10 shows a linear drive unit in which the resonator arms 21, 22 are elastically suspended by an attachment necking 36 linking each respective arm to the connection region 20. The torsional strength with regard to rotation around an axis normal to the reference plane 28 is smaller than along most of the arms. As a result, the arms as a whole, including a counterweight section 21d, 22d of each arm, can oscillate relative to the connection region 20 and the excitation means 23. This makes it possible to reduce the length of the arms, and this in turn makes it possible to reduce the distance between the first contact area 41 and second contact area 42.

Figure 11:
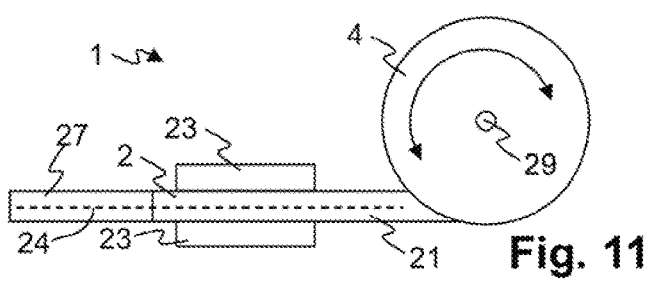
FIG. 11 a rotary drive unit.

FIG. 11 shows a rotary drive unit, with the passive element 4 being arranged to rotate around an axis of rotation 29. The axis is normal to the resonator axis 24 and parallel to the reference plane 28. Such an arrangement can be implemented in combination with any of the embodiments presented herein, with one or more rotating passive elements 4 replacing corresponding linearly moving passive elements 4. In embodiments in which the contact elements 31, 32 face outward, the passive element 4 can include two rotating disc or rings—or only sections of discs or rings—that are distanced from one another along the axis of rotation 29. The first contact area 41 and second contact area 42 are located on surfaces of the discs or rings (or sections thereof) facing inward. In other embodiments, the contact elements 31, 32 face inward. In combination with embodiments with two pairs of arms, two rotating passive elements 4 can be present, each one driven by one of the two pairs of arms.

While the invention has been described in present embodiments, it is distinctly understood that the invention is not limited thereto, but may be otherwise variously embodied and practised within the scope of the claims.

The invention claimed is:

1. A drive unit for driving a passive element relative to an active element, wherein the active element comprises:
   a resonator and at least one excitation means for exciting oscillations in the resonator,
   the resonator comprising at least two arms extending from a connection region of the resonator at a same side of the connection region,
   the resonator and the at least two arms extending in parallel to a reference plane,
   each of the at least two arms comprising, at an outer end of the arm, a contact element,
   the contact elements being movable via oscillating movements of the at least two arms,
   the passive element being arranged to be driven and moved relative to the active element via the oscillating movements;
   the passive element comprises contact areas, each contact area being arranged to be in contact with a respective one of the contact elements;
   wherein
   each of the at least two arms comprises, at an outer end of the arm, a protrusion extending in a first direction, the first direction being inward, toward an other arm or outward, away from the other arm, and
   on at least one of the at least two arms, the respective contact element arranged at the at least one arm outer end extends in a second direction, the second direction being opposite to the first direction;
   wherein, for each of the at least two arms, a stiffness of the arm with respect to rotation around an axis normal to the reference plane, has a minimum value at a location of the arm that is inward of an end section of the arm comprising the respective protrusion and optionally also the respective contact element.

2. The drive unit of claim 1, wherein on both of the at least two arms, the respective contact element arranged at the outer end of the arm, extends in the second direction.

3. The drive unit of claim 1, wherein the resonator is shaped from a flat piece of material, and for each of the at least two arms an end section of the arm comprising the protrusion and optionally the contact element is separated from the remainder of the arm by a necking.

4. A drive unit for driving a passive element relative to an active element, wherein the active element comprises:
a resonator and at least one excitation means for exciting oscillations in the resonator,
the resonator comprising at least two arms extending from a connection region of the resonator at a same side of the connection region,
the resonator and the at least two arms extending in parallel to a reference plane,
each of the at least two arms comprising, at an outer end of the arm, a contact element,
the contact elements being movable via oscillating movements of the at least two arms,
the passive element being arranged to be driven and moved relative to the active element via the oscillating movements;
the passive element comprises contact areas, each contact area being arranged to be in contact with a respective one of the contact elements;
wherein
each of the at least two arms comprises, at an outer end of the arm, a protrusion extending in a first direction, the first direction being inward, toward an other arm or outward, away from the other arm, and
on at least one of the at least two arms, the respective contact element arranged at the at least one arm outer end extends in a second direction, the second direction being opposite to the first direction;
wherein a first arm of the at least two arms comprises, in a section opposite to the outer end, a first further contact element extending outward, away from a second arm of the at least two arms,
and the second arm comprises, in a section opposite to the outer end, a second further contact element, extending outward, away from the first arm.

5. The drive unit of claim 4, wherein the shapes of the first and second pairs of arms are substantially mirror-images of one another.

6. A drive unit for driving a passive element relative to an active element, wherein the active element comprises:
a resonator and at least one excitation means for exciting oscillations in the resonator,
the resonator comprising a first pair of arms extending from a connection region of the resonator at a same side of the connection region,
the resonator and the first pair of arms extending in parallel to a reference plane,
each of the first pair of arms comprising, at an outer end of the arm, a contact element,
the contact elements being movable via oscillating movements of the first pair of arms,
the passive element being arranged to be driven and moved relative to the active element by way of these oscillating movements;
the passive element comprises contact areas, each contact area being arranged to be in contact with a respective one of the contact elements;
wherein
the resonator comprises a second pair of arms extending from the connection region of the resonator in the opposite direction as the first pair of arms.

7. The drive unit of claim 6, wherein one arm of the first pair of arms comprises, at an outer end of the arm, a protrusion extending inward, toward an other arm of the first pair of arms, and
on at least said one arm of the first pair of arms, the respective contact element arranged at the outer end of the at least one arm of the first pair of arms extends outward, away from the other arm of the first pair of arms.

8. The drive unit of claim 6, wherein each of the arms of the second pair of arms comprises, at an outer end of the arm, a protrusion extending inward, toward the other arm of the second pair of arms, and
on at least one of the arms of the second pair of arms, the respective contact element arranged at the outer end of the at least one of the arms of the second pair of arms extends outward, away from other arm of the second pair of arms.

9. The drive unit of claim 6, wherein each of the arms of the second pair of arms comprises, at an outer end of the arm, a protrusion extending inward, toward an other arm of the second pair of arms, and
on at least one of the arms of the second pair of arms, the respective contact element arranged at the outer end of the at least one arm of the second pair of arms is part of the respective protrusion extending inward.

10. A drive unit for driving a passive element relative to an active element, wherein the active element comprises:
a resonator and at least one excitation means for exciting oscillations in the resonator,
the resonator comprising at least two arms extending from a connection region of the resonator at a same side of the connection region,
the resonator and the at least two arms extending in parallel to a reference plane,
each of the at least two arms comprising, at an outer end of the arm, a contact element, the contact elements facing outward, away from the other arm,
the contact elements being movable via oscillating movements of the at least two arms,
the passive element being arranged to be driven and moved relative to the active element via said oscillating movements;
the passive element comprises contact areas, each contact area being arranged to be in contact with a respective one of the contact elements;
wherein the resonator is shaped from a flat piece of material,
wherein
between each of the at least two arms and the connection region there is an attachment necking;
wherein each of the at least two arms, from the attachment necking comprises an active section that extends in a first direction parallel to a resonator axis towards the respective outer end with the respective contact element, and a counterweight section, that extends in a second direction opposite to the first direction;
wherein for each of the at least two arms, a stiffness of the arm, with respect to rotation around an axis normal to the reference plane, in the counterweight section and in the active section where the arm is joined to the counterweight section is smaller than in the attachment necking.

11. The drive unit of claim 10, wherein a stiffness of the arm in the active section up to and not including a necking at which the arm is bent outward toward the respective contact element is smaller than in the attachment necking.

12. The drive unit of claim 11, wherein the at least one excitation means for exciting oscillations covers at least the attachment necking and part of the counterweight section and part of the active section.

13. The drive unit of claim 12, wherein the at least one excitation means for exciting oscillations covers cut-out regions in the resonator that form the attachment necking.

14. A drive unit for driving a passive element relative to an active element, wherein the active element comprises:
 a resonator and at least one excitation means for exciting oscillations in the resonator,
 the resonator comprising at least two arms extending from a connection region of the resonator at a same side of the connection region,
 the resonator and the at least two arms extending in parallel to a reference plane,
 each of the at least two arms comprising, at an outer end of the arm, a contact element,
 the contact elements being movable via oscillating movements of the at least two arms,
 the passive elements being arranged to be driven and moved relative to the active element by said oscillating movements;
 the passive element comprises contact areas, each contact area being arranged to be in contact with a respective one of the contact elements;
 wherein the resonator is shaped from a flat piece of material,
 wherein
 in regions covered by the at least one excitation means for exciting oscillations, the resonator comprises holes or openings.

15. The drive unit of claim 14, wherein a wear suppressing element is arranged on the passive element in the contact areas.

16. The drive unit of claim 15, wherein the wear suppressing part is made of a material with a higher degree of hardness than a surrounding region of the passive element or is created by a hardening treatment of the material of the passive element.

17. The drive unit of claim 15, wherein the wear suppressing part is made of a ceramic material.

18. The drive unit of claim 14, wherein the resonator comprises a first surface and an opposed second surface, both parallel to the reference plane, and wherein one excitation means is arranged on the first surface and optionally wherein another excitation means is arranged on the opposed second surface.

19. The drive unit of claim 14, wherein the passive element is arranged to translate along a linear movement axis, the linear movement axis being parallel to the reference plane, and also parallel to the resonator axis.

20. The drive unit of claim 14, wherein the passive element is arranged to rotate around a rotary movement axis, the rotary movement axis being parallel to the reference plane, and also perpendicular to the resonator axis.

21. The drive unit of claim 14, wherein a surface of the resonator and/or the passive element is treated with high precision vibratory finishing or chemical polishing.

22. The drive unit of claim 14, wherein the contact elements each comprise flat region.

23. The drive unit of claim 22, wherein a resonator length is defined as the dimension of the resonator along the resonator axis, from the ends of the at least two arms to the opposing ends of their counterweight sections, and wherein the extension of each flat region, projected onto the reference plane, is between one tenth and one hundredth of the resonator length.

24. The drive unit of claim 23, wherein the length of the resonator is between three and five millimetres, and the extension of the flat region is between 0.05 millimetres and 0.15 millimetres.

* * * * *